United States Patent
Yang et al.

(10) Patent No.: US 7,164,827 B2
(45) Date of Patent: Jan. 16, 2007

(54) OPTICAL MODULE WITH ACCURATE AXIAL ALIGNMENT USING A PLATFORM

(75) Inventors: Kwang Jin Yang, Suwon-si (KR); Dae Jin Kim, Suwon-si (KR); Do Ik Kim, Goyang-si (KR)

(73) Assignee: Optoelectronics Solutions Co., Ltd., Gwangju (KR)

( * ) Notice: Subject to any disclaimer, the term of this patent is extended or adjusted under 35 U.S.C. 154(b) by 33 days.

(21) Appl. No.: 10/999,444

(22) Filed: Nov. 29, 2004

(65) Prior Publication Data

US 2005/0117848 A1  Jun. 2, 2005

(30) Foreign Application Priority Data

Nov. 27, 2003  (KR) ............. 10-2003-0084992

(51) Int. Cl.
  G02B 6/42  (2006.01)
  G02B 6/36  (2006.01)
(52) U.S. Cl. .......................... 385/52; 385/92
(58) Field of Classification Search .......... 385/52, 385/92, 88, 89
See application file for complete search history.

(56) References Cited

U.S. PATENT DOCUMENTS 6,299,362 B1 * 10/2001 Gilliland et al. ............... 385/92
6,554,494 B1 * 4/2003 Bruland et al. ............... 385/92

* cited by examiner

*Primary Examiner*—Brian Healy
*Assistant Examiner*—Michael P. Mooney
(74) *Attorney, Agent, or Firm*—Jordan and Hamburg LLP

(57) ABSTRACT

An optical communication module is provided with a platform to provide an accurate axial alignment with optical transceiving subassemblies. In the optical communication module, axes of the optical transceiving sub-assemblies are aligned by virtue of previously established axial alignment of the platform, and the platform is fixed to a main body by inserting an insertion jaw of a cover into an insertion groove formed on an upper surface of the platform. After the optical transceiving subassemblies are inserted into the platform having the axial alignment required for a system, a bonding agent is filled into spaces defined in the platform, thereby preventing the axes from deviated by an external force. The optical communication module allows for easier and more accurate guidance of a connection between the optical transceiving sub-assemblies and the optical connector, thereby minimizing the optical loss, and preventing the patterns on the printed circuit board from being damaged due to the insertion and disconnection of the optical connector.

4 Claims, 5 Drawing Sheets

(a)

(b)

PRIOR ART

OPTICAL MODULE WITH ACCURATE AXIAL ALIGNMENT USING A PLATFORM

BACKGROUND OF THE INVENTION

1. Field of the Invention

The present invention relates to an optical communication module with a platform for axial alignment, and more particularly, to an optical communication module with a platform for axial alignment, designed to perform a reliable transmission of data to an optical transceiver, which transforms an optical signal to an electrical signal and vice versa, thereby mining data loss, and to allow for easier and more accurate axial alignment of an optical transceiving sub-assembly to an optical connector.

2. Description of the Related Art

According to a conventional technology for mounting a Transmitter Optical Sub-Assembly (TOSA) and a Receiver Optical Sub-Assembly (ROSA) to an optical communication module, as shown in FIG. 6, after an optical transceiving sub-assembly 104 (TOSA/ROSA) is located on a mounting portion of a main body 500 of the optical communication module, a cover 200 is located thereon and fixed to the optical transceiving sub-assembly 104 in order to enhance a mechanical stability of the optical communication module and the optical transceiving sub-assembly 104.

However, with such a conventional technology, there are not only large alignment errors between the optical communication module and the optical transceiving sub-assembly 104 due to a structural tolerance, but also a high possibility of damage of the optical transceiving sub-assembly 104 due to an excessive force caused by an excessive mechanical pressure applied to the optical transceiving sub-assembly 104 from the cover 200.

Furthermore, since a plurality of optical transceiving sub-assemblies 104 are directly mounted on the main body 500 of the optical communication module, the main body 500 has a shape significantly depending on outer features of the optical transceiving sub-assemblies 104, and thus requires different shapes according to the shapes of the optical transceiving sub-assemblies 104, thereby remarkably increasing manufacturing costs.

Moreover, since a force is applied to a mounting axis of the optical transceiving sub-assembly 104 when inserting or disconnecting an optical connector from the optical transceiving sub-assembly 104, damage occurs to patterns on a printed circuit board (PCB) connected to the lead of the optical transceiving sub-assembly 104, thereby disabling accurate transceiving of the optical signal.

SUMMARY OF THE INVENTION

The present invention has been made to solve the above problems, and it is an object of the present invention to provide an optical communication module with a platform for axial alignment, designed to more accurately guide a connection between one or more optical transceiving sub-assemblies and an optical connector, which is an optical signal transmitting media, thereby minimizing optical loss, and to prevent patterns on a printed circuit board from being damaged due to insertion and disconnection of the optical connector.

It is another object of the present invention to provide an optical communication module with a platform for axial alignment, in which the platform is made of a material having a sufficient heat-releasing characteristic, and thus can reduce a temperature difference between the inner portion and the surface of the optical communication module, thereby expanding a range of an operating temperature.

It is yet another object of the present invention to provide an optical communication module with a platform for axial alignment, in which the platform is used in the optical communication module within a predetermined volume, and thus allows various shapes of the optical transceiving sub-assemblies to be formed by use of the same dies, thereby reducing manufacturing costs of the optical communication module.

In accordance with an aspect of the present invention, the above and other objects can be accomplished by the provision of an optical communication module with a platform for axial alignment to allow for an accurate axial alignment between optical transceiving sub-assemblies and an optical connector, the optical communication module comprising: the platform having upper and lower insertion grooves respectively formed on upper and lower surfaces of the platform, each having the same configuration, and two holes penetrating from a front surface to a rear surface of the platform such that the optical transceiving sub-assemblies may be inserted through the holes; a cover to prevent the platform having the optical transceiving sub-assemblies assembled thereto from being disconnected, and including an insertion jaw protruded downward to be inserted into the upper insertion groove of the platform; and a main body for mounting the platform having the optical transceiving sub-assemblies assembled thereto, and including an insertion jaw protruded from the main body, such that the platform can be mounted on the main body with the insertion jaw inserted into the lower insertion groove of the platform.

The platform may further includes receptacles formed within the holes, respectively, and each of receptacles may have a space defined therein such that a bonding agent including an epoxy can be filled in the receptacle so as to tightly fix the associated optical transceiving sub-assembly to the platform.

The platform may be varied in shape according to outer features of the optical transceiving sub-assemblies.

Accordingly, with the construction of the optical communication module of the invention, the optical communication module allows for easier and more accurate guidance of a connection between the optical transceiving sub-assemblies and the optical connector, which is the optical signal transmitting media, thereby minimizing the optical loss, and preventing the patterns on the printed circuit board from being damaged due to the insertion and disconnection of the optical connector.

BRIEF DESCRIPTION OF THE DRAWINGS

The foregoing and other objects and features of the present invention will be more clearly understood from the following detailed description taken in conjunction with the accompanying drawings, in which:

FIGS. 5a and 5b show a completed optical communication module with components shown in FIG. 4, in which FIG. 5a is a side view illustrating the optical communication module connected to an optical connector, and FIG. 5b is a plan view illustrating the optical communication module.

DESCRIPTION OF THE PREFERRED EMBODIMENTS

Preferred embodiments will now be described in detail with reference to the accompanying drawings.

Figure 1:
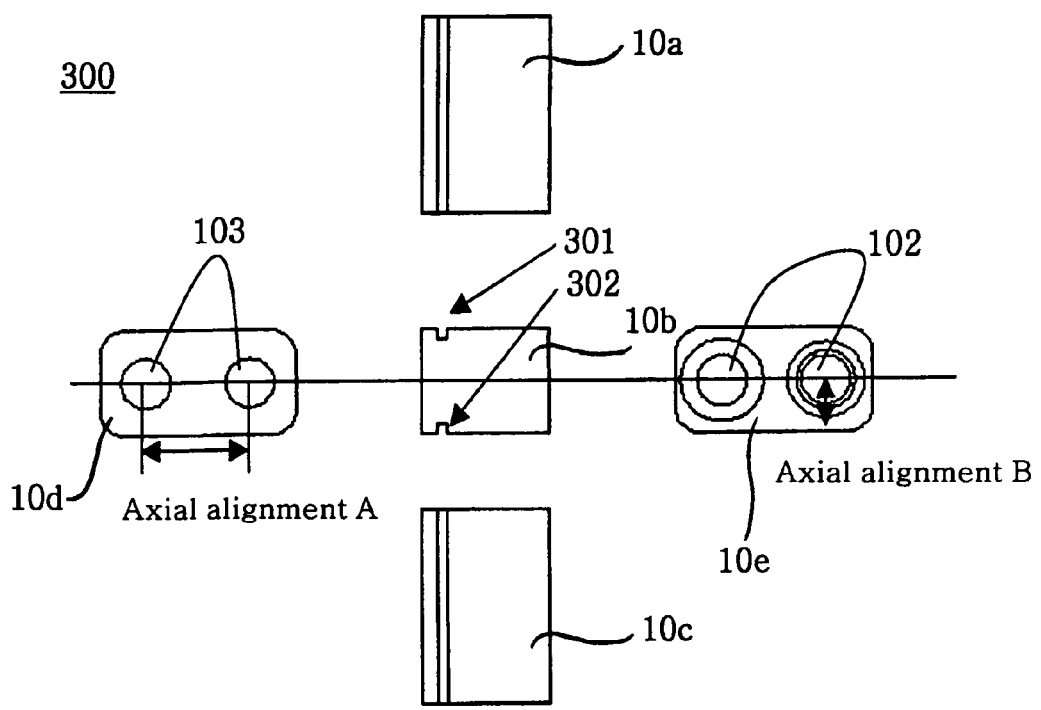
FIG. 1 is a partially enlarged view of the construction of a platform for axial alignment used for an optical communication module in accordance with one embodiment of the present invention, in which left, right, top, and bottom sides of the platform are shown.
Figure 2:
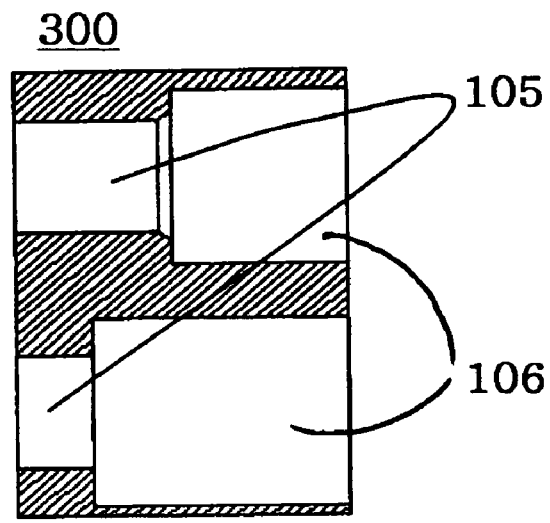
FIG. 2 is a cross-sectional view of the platform for axial alignment used for the optical communication module in accordance with one embodiment of the present invention.
Figure 3:
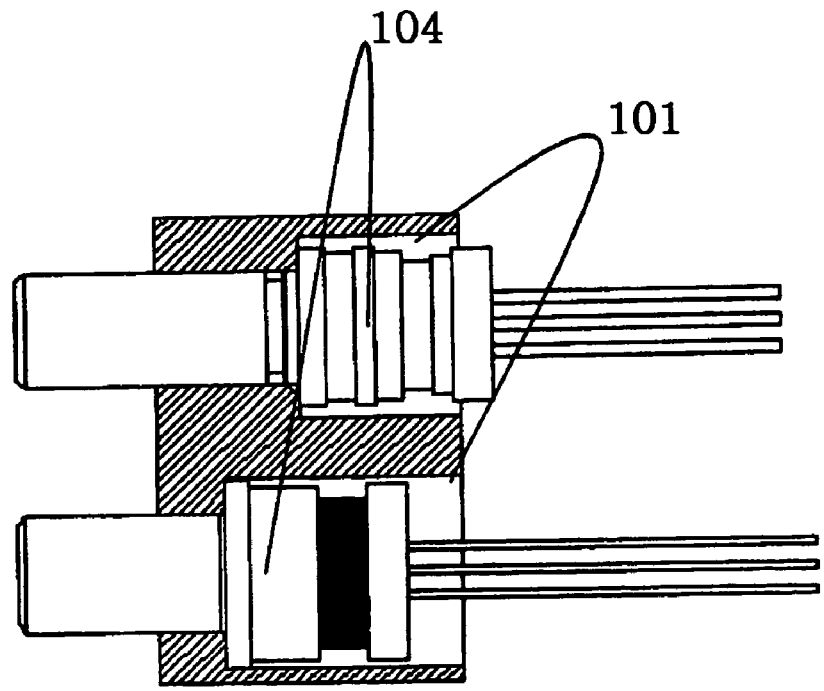
FIG. 3 is a cross-sectional view of a Transmitter Optical Sub-Assembly (TOSA) and a Receiver Optical Sub-Assembly (ROSA) assembled to the platform for axial alignment used for the optical communication module shown in FIG. 2.
Figure 4:
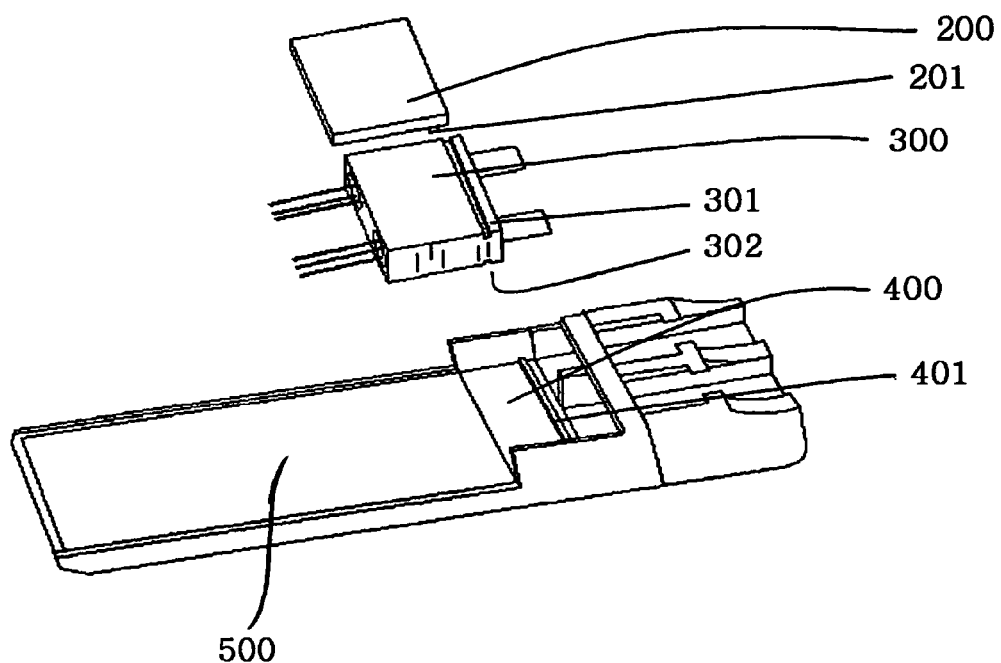
FIG. 4 is an exploded perspective view of the platform for axial alignment used for the optical communication module in accordance with one embodiment of the present invention.

FIG. 1 is a partially enlarged view of the construction of a platform for axial alignment used for an optical communication module in accordance with one embodiment of the present invention, in which left, right, top, and bottom sides of the platform are shown. FIG. 2 is a cross-sectional view of the platform for axial alignment used for the optical communication module in accordance with one embodiment of the present invention. FIG. 3 is a cross-sectional view of a Transmitter Optical Sub-Assembly (TOSA) and a Receiver Optical Sub-Assembly (ROSA) assembled to the platform for axial alignment used for the optical communication module shown in FIG. 2. FIG. 4 is an exploded perspective view of the platform for axial alignment used for the optical communication module in accordance with one embodiment of the present invention. FIGS. 5a and 5b show a completed optical communication module with components shown in FIG. 4, in which FIG. 5a is a side view illustrating the optical communication module connected to an optical connector, and FIG. 5b is a plan view illustrating the optical communication module.

Referring to FIG. 1, a platform 300 for axial alignment used for the optical communication module in accordance with one embodiment of the invention has upper and lower surfaces 10a and 10c, each having the same configuration, and two holes 102 and 103 (for reference, the reference numeral 102 denotes rear holes of the platform, and the reference numeral 103 denotes front holes of the platform in FIG. 1) penetrating from a front surface 10d to a rear surface 10e of the platform 300 such that optical transceiving sub-assemblies 104 (see FIG. 4) can be inserted through the holes 102 and 103, respectively.

Additionally, the upper and lower surfaces 10a and 10c of the platform 300 are formed with upper and lower grooves 301 and 302, to which insertion jaws 210 and 401 (see FIG. 4) are inserted and then fixed, respectively.

Each of the two holes 102 and 103 formed through the platform 300 shown in FIG. 1 has an internal configuration adapted to have receptacles 105 and 106, to which some parts of the associated optical transceiving sub-assembly 104 and the other parts thereof are inserted and fixed.

FIG. 3 shows the optical transceiving sub-assemblies 104 assembled to the optical connector. As shown in the drawing, each of the receptacles 106 has the associated optical transceiving sub-assembly 104 inserted thereto, and has a space 101 defined therein and filled with a bonding agent.

Configurations of the optical communication module having the platform according to the invention will now be described in detail.

As described above, according to the present invention, the platform 300 is used for the optical communication module, in order to ensure an accurate axial alignment between the optical connector and the optical transceiving subassemblies of the optical communication module operated in a transmission system for optical communication, and to minimize optical loss by preventing a printed circuit board from being damaged.

First, as shown in FIG. 1, after optical axes required for the system are accurately aligned in the platform 300, such as an axial alignment A and an axial alignment A, each space 101 is formed in the platform 300 with a clearance such that each receptacle 106 of the platform 300 having the associated optical transceiving sub-assembly 104 inserted thereto is filled with the bonding agent. Additionally, other spaces are formed in the respective receptacles 105 of the platform 300 such that some part of the associated optical transceiving sub-assembly 104 can be partially fixed in the associated receptacle 105 while allowing the optical axis to be aligned.

Then, the optical transceiving sub-assemblies 104 are inserted into the rear holes 102 of the platform 300 shown in FIG. 1, and come out from the front holes 103 thereof having the axis alignment A. As a result, the optical transceiving sub-assemblies 104 are assembled to the platform 300 as shown in FIG. 1.

Meanwhile, in an assembled state of the optical transceiving sub-assemblies 104 as shown in FIG. 3, the spaces 101 are formed in the receptacles 106, respectively. Accordingly, when the spaces 101 are filled with the bonding agent, such as an epoxy, the optical transceiving sub-assemblies 104 are fixed in the platform 300, thereby allowing for the axial alignment required for the system and securing the optical transceiving sub-assemblies 104 thereto.

Furthermore, as previously described, the platform 300 is formed with the upper and lower grooves 301 and 302 in order to prevent vertical and horizontal movement of the platform 300.

Referring to FIG. 4, the platform 300 having the optical transceiving sub-assemblies 104 assembled thereto is mounted on a mounting portion 400 in a main body 500 of the optical communication module.

The mounting portion 400 has an insertion jaw 401 protruded from the mounting portion 400 to correspond to the lower insertion groove 302 of the platform 300, so that the platform 300 having the optical transceiving sub-assemblies 104 assembled thereto can be fixed to the main body 500 with the lower insertion groove 302 inserted to the insertion jaw 401.

The optical communication module is provided with a cover 200 positioned on the platform 300 in order to prevent the platform having the optical transceiving sub-assemblies 104 assembled thereto from being disconnected from the main body 500.

At this time, the cover 200 has an insertion jaw 201 protruded from the bottom surface of the cover 200 to correspond to an upper insertion groove 310 of the platform 300. Accordingly, with the insertion jaw 201 inserted into the upper insertion groove 301 of the platform 300, the cover 200 is placed on the platform 300, and then fixes it to the main body 500.

With the construction described above, since the optical axes are previously aligned in the platform, instead of aligning the optical axes after positioning them on the printed circuit board, an additional process for aligning the optical axes is not needed.

Figure 5:
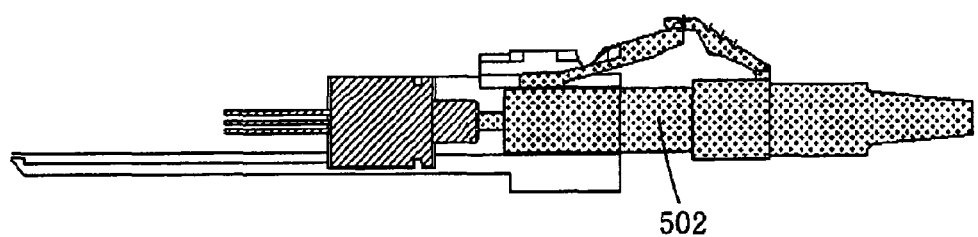
Figure 5:
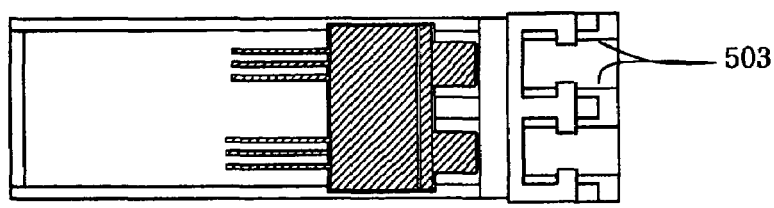
Figure 6:
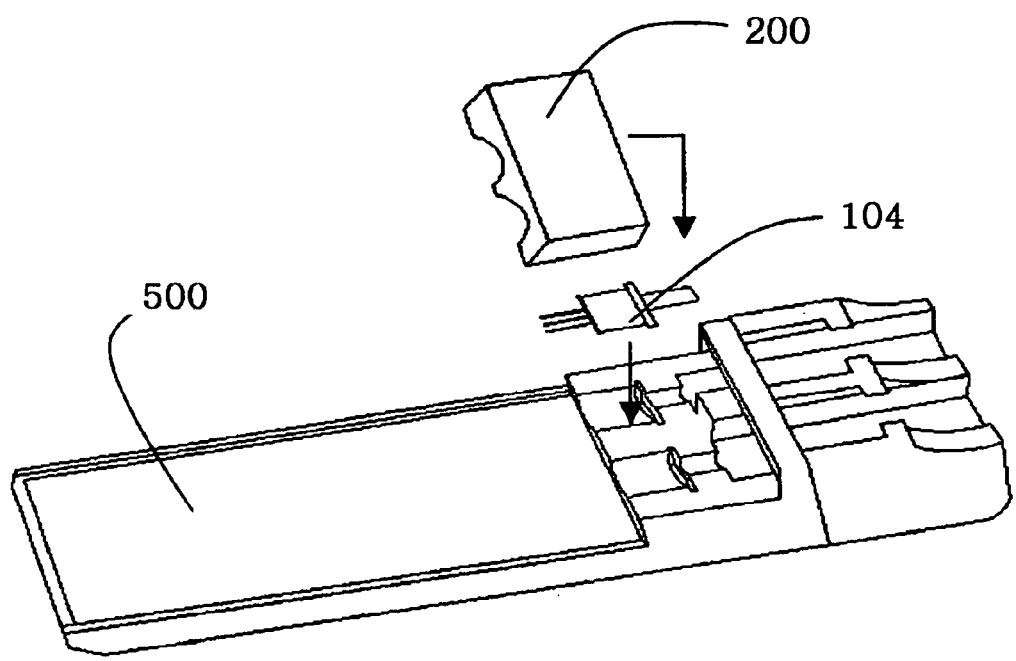
FIG. 6 is an exploded perspective view illustrating a conventional Small Form-factor Plug-in (SFP) module.

Accordingly, as shown in FIG. 5, when an optical connector 501 is inserted into spaces 503 communicated with the receptacles of the optical transceiving sub-assemblies, it can be accurately aligned with the optical transceiving sub-assemblies, thereby not only preventing the optical loss upon optical transmission, but also allowing the optical axes to be aligned without an excessive force for the axial alignment.

The platform 300 mounted on the main body 400 of the optical communication module is assembled to the printed circuit board, constituting the optical communication module.

Meanwhile, since the optical transceiving sub-assemblies are fixed within the platform 300 by means of the bonding agent within the spaces 101 and of the insertion jaws 201 and 401 inserted into the upper and lower insertion groove 301 and 302, a force is prevented from being transmitted to the printed circuit board upon insertion and disconnection of the optical connector.

Since the cover 200 is subjected to a pressure from a case shield surrounding an outer feature of the optical communication module, and then fixes the optical transceiving sub-assemblies to the module without a direct influence on the optical transceiving sub-assemblies, it never influences the characteristics of the optical communication module.

Additionally, even though the outer features of the optical transceiving sub-assemblies 104 are changed in shape, only the platform 300 having the optical transceiving sub-assemblies assembled to the platform 300 is changed corresponding to changed shapes of the optical transceiving sub-assemblies 104, instead of changing the dies for the platform 300. As a result, when manufacturing the optical communication module according to the present invention, not only can the manufacturing costs thereof be reduced, but the yield of the products can also be maximized.

As apparent from the above description, according to the present invention, the optical communication module according to the present invention allows for easier and more accurate guidance of the connection between the optical transceiving sub-assemblies and the optical connector, which is the optical signal transmitting media, thereby minimizing the optical loss, and preventing the patterns on the printed circuit board from being damaged due to the insertion and disconnection of the optical connector.

Further, as the optical communication module has the platform made of the material having a sufficient heat-releasing characteristic, the optical communication module can release heat from an inner portion of the optical transceiver, and thus can reduce a temperature difference between the inner portion and the surface of the optical communication module, thereby expanding a range of an operating temperature.

Additionally, the platform is used in the optical communication module within a predetermined volume, and thus allows various shapes of the optical transceiving sub-assemblies to be formed by use of the same dies, thereby reducing the manufacturing costs of the optical communication module.

It should be understood that the embodiments and the accompanying drawings as described above have been described for illustrative purposes and the present invention is limited by the following claims. Further, those skilled in the art will appreciate that various modifications, additions and substitutions are allowed without departing from the scope and spirit of the invention as set forth in the accompanying claims.

What is claimed is:

1. An optical communication module with a platform for axial alignment to allow for an accurate alignment between optical transceiving subassemblies and an optical connector, the optical communication module comprising:
   the platform having upper and lower insertion grooves respectively formed on upper and lower surfaces of the platform, each having the same configuration, and two holes penetrating from a front surface to a rear surface of the platform such that the optical transceiving sub-assemblies may be inserted through the holes;
   a cover to prevent the platform having the optical transceiving sub-assemblies assembled thereto from being disconnected, and including an insertion jaw protruded downward to be inserted into the upper insertion groove of the platform; and
   a main body for mounting the platform having the optical transceiving sub-assemblies assembled thereto, and including an insertion jaw protruded from the main body, such that the platform can be mounted on the main body with the insertion jaw inserted into the lower insertion groove of the platform.

2. The optical communication module as set forth in claim 1, wherein the platform further includes receptacles formed within the holes, respectively, and each of receptacles has a space defined therein such that a bonding agent including an epoxy can be filled in the receptacle so as to tightly fix the associated optical transceiving sub-assembly to the platform.

3. The optical communication module as set forth in claim 1, wherein the platform is changed in shape according to an outer feature of each of the optical transceiving sub-assemblies.

4. The optical communication module as set forth in claim 1 or 2, wherein the platform further includes receptacles formed within the holes, and each of the receptacles consists of a primary receptacle portion and a secondary receptacle portion, the primary and secondary receptacle portions having spaces defined therein, respectively, so as to partially fix the associated optical transceiving sub-assembly to the platform.

* * * * *